United States Patent
Xu

(10) Patent No.: US 7,447,044 B2
(45) Date of Patent: Nov. 4, 2008

(54) FIXING MECHANISM FOR PRINTED CIRCUIT BOARD

(75) Inventor: Ji-Guo Xu, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 498 days.

(21) Appl. No.: 11/209,093

(22) Filed: Aug. 22, 2005

(65) Prior Publication Data
US 2006/0044776 A1    Mar. 2, 2006

(30) Foreign Application Priority Data
Aug. 27, 2004   (CN) .................... 2004 2 0083519

(51) Int. Cl.
*H05K 1/11* (2006.01)
*H05K 1/14* (2006.01)
(52) U.S. Cl. ..................... 361/803; 361/810
(58) Field of Classification Search ............ 361/807, 361/810, 752; 174/138
See application file for complete search history.

(56) References Cited

U.S. PATENT DOCUMENTS

| | | |
|---|---|---|
| 6,470,555 B2 | 10/2002 | Boe |
| 6,741,460 B2 | 5/2004 | Huang |
| 6,761,273 B1 * | 7/2004 | Chen et al. ............ 211/41.17 |

FOREIGN PATENT DOCUMENTS

CN    00201452.1    12/2000

* cited by examiner

*Primary Examiner*—Hung S Bui
(74) *Attorney, Agent, or Firm*—Morris, Manning & Martin LLP; Tim Tingkang Xia

(57) ABSTRACT

A fixing mechanism for securing a printed circuit board (10) to a computer chassis, includes a fixing board (20), a tray (60) for securing the printed circuit board, and a driving device (40). The fixing board forms a number of fastening portions (21) to engage in fastening holes (65) of the tray. The driving device includes a sliding board (41) slidably attached to the fixing board, a pull handle (47) pivotally connected to the fixing board, a connecting block (43) arranged to the pull handle, and a linking element (45). The linking element connects the connecting block to the sliding board, the tray is connected to the sliding board. The pull handle is rotated to move the tray between a locked position and an unlocked position.

17 Claims, 6 Drawing Sheets

FIXING MECHANISM FOR PRINTED CIRCUIT BOARD

BACKGROUND OF THE INVENTION

1. Field of the Invention

The present invention relates to a fixing mechanism for a printed circuit board (PCB), and more particularly to a fixing mechanism which facilitates attachment and/or detachment of a PCB in a computer.

2. General Background

A conventional method of installing a PCB, such as a motherboard, in a computer is to simply screw the PCB to bosses or other mounting structures suitably mounted on a chassis. However, this PCB installation method substantially increases the time, and thus the cost, required to construct the computer in addition to adding to the complexity and difficulty of assembling, and later disassembling and servicing the computer.

A relatively recent improvement in mounting of a PCB in a computer has introduced a tray structure to support the PCB.

What is needed is a fixing mechanism which facilitates attachment and/or detachment of a PCB in a computer.

SUMMARY

A fixing mechanism in accordance with a preferred embodiment is provided for securing a printed circuit board to a computer chassis. The fixing mechanism includes a fixing board, a tray for securing the printed circuit board, and a driving device. The fixing board forms a number of fastening portions to engage in fastening holes of the tray. The driving device includes a sliding board slidably attached to the fixing board, a pull handle pivotally connected to the fixing board, a connecting block arranged to the pull handle, and a linking element. The linking element connects the connecting block to the sliding board, the tray is connected to the sliding board. The pull handle is rotated to move the tray between a locked position and an unlocked position.

Other objects, advantages and novel features will become more apparent from the following detailed description when taken in conjunction with the accompanying drawings, in which:

DETAILED DESCRIPTION OF THE EMBODIMENT

Figure 1:
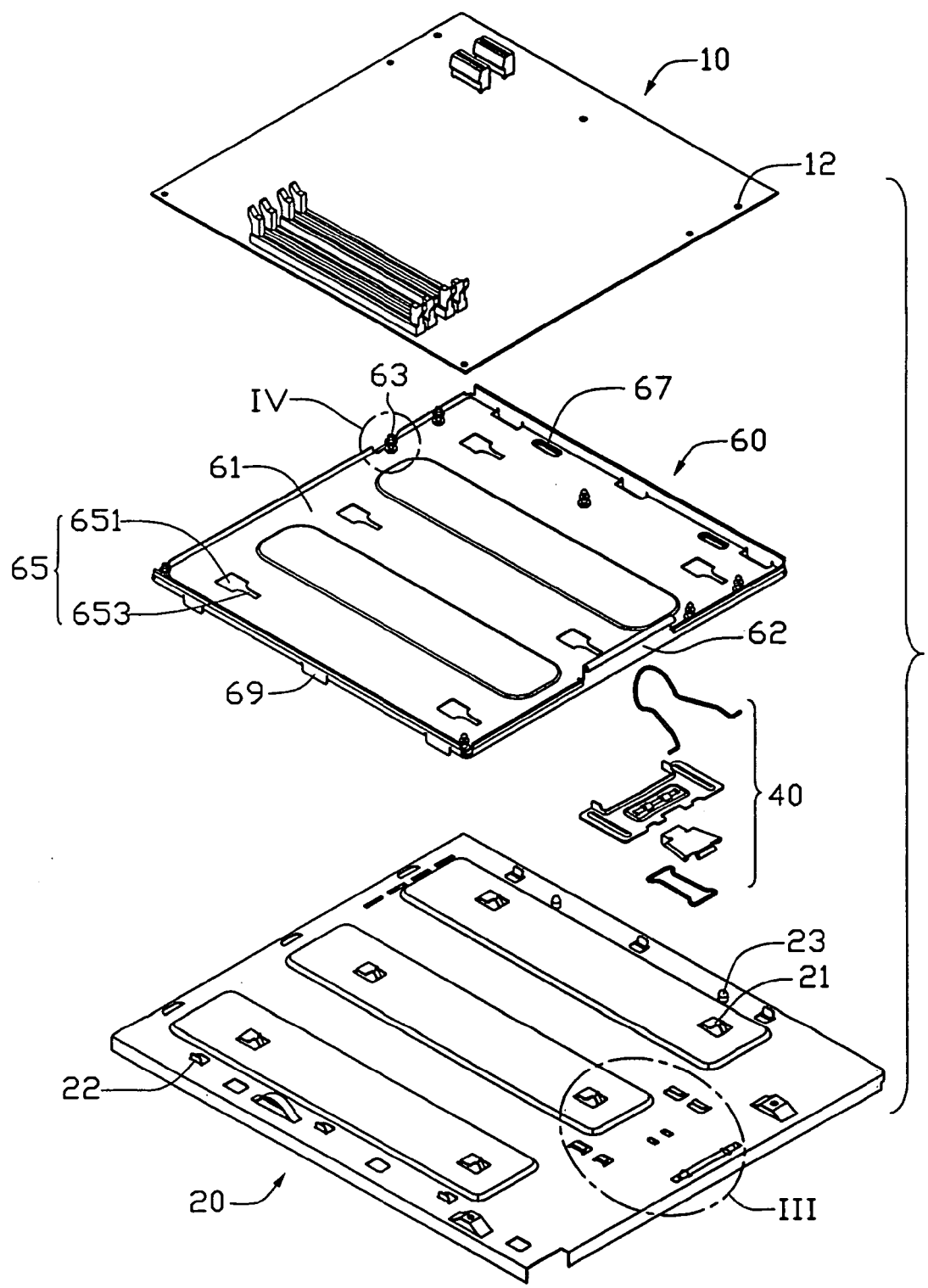
FIG. 1 is an exploded, isometric view of a fixing mechanism and a PCB in accordance with a preferred embodiment of the present invention, the fixing mechanism including a tray, a driving device, and a fixing board.

Referring to FIG. 1, a fixing mechanism is used for securing a printed circuit board (PCB) 10 in accordance with a preferred embodiment of the present invention to a chassis of an electronic device like a computer. The fixing mechanism includes a fixing board 20 (for example, a side plate of the computer chassis), a driving device 40 disposed onto the fixing board 20, and a tray 60 for supporting the PCB 10. The PCB 10 defines a plurality of through holes 12.

Figure 3:
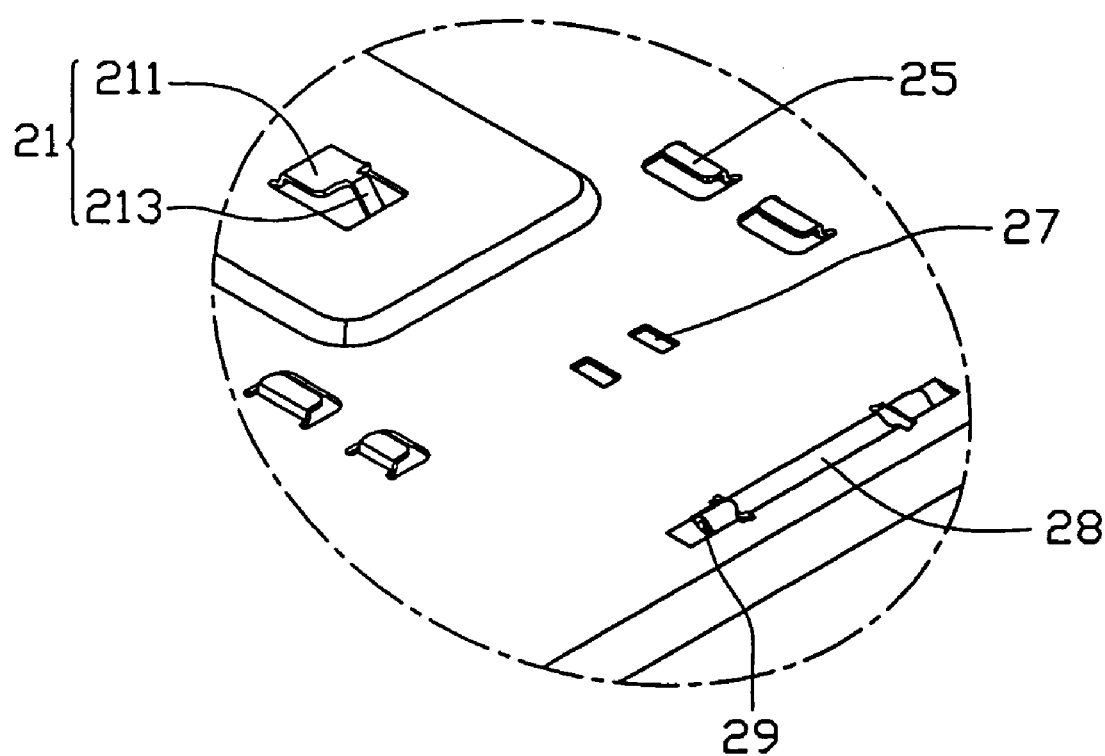
FIG. 3 is an enlarged view of the encircled portion III of FIG. 1.

The fixing board 20 forms a plurality of fastening portions 21. Each fastening portion 21 includes an L-shaped fastening tab 211 stamped upwardly from the fixing board 20, and a tongue 213 slantingly connecting the fastening tab 211 to the fixing board 20. A plurality of curb tabs 22 is stamped upwardly from opposite sides of the fixing board 20. A plurality of guiding posts 23 extends upwardly from one of the opposite sides of the fixing board 20. Referring also to FIG. 3, a plurality of bent piece 25 is formed from a front portion of the fixing board 20 for defining a sliding space therebetween. Two assembly holes 27 are defined in the fixing board 20. An assembly groove 28 is defined in the fixing board 20 with a curved cross-section. Two curved bridges are stamped upwardly from two opposite sides of the assembly groove 28 thereby defining two through slots 29.

Figure 2:
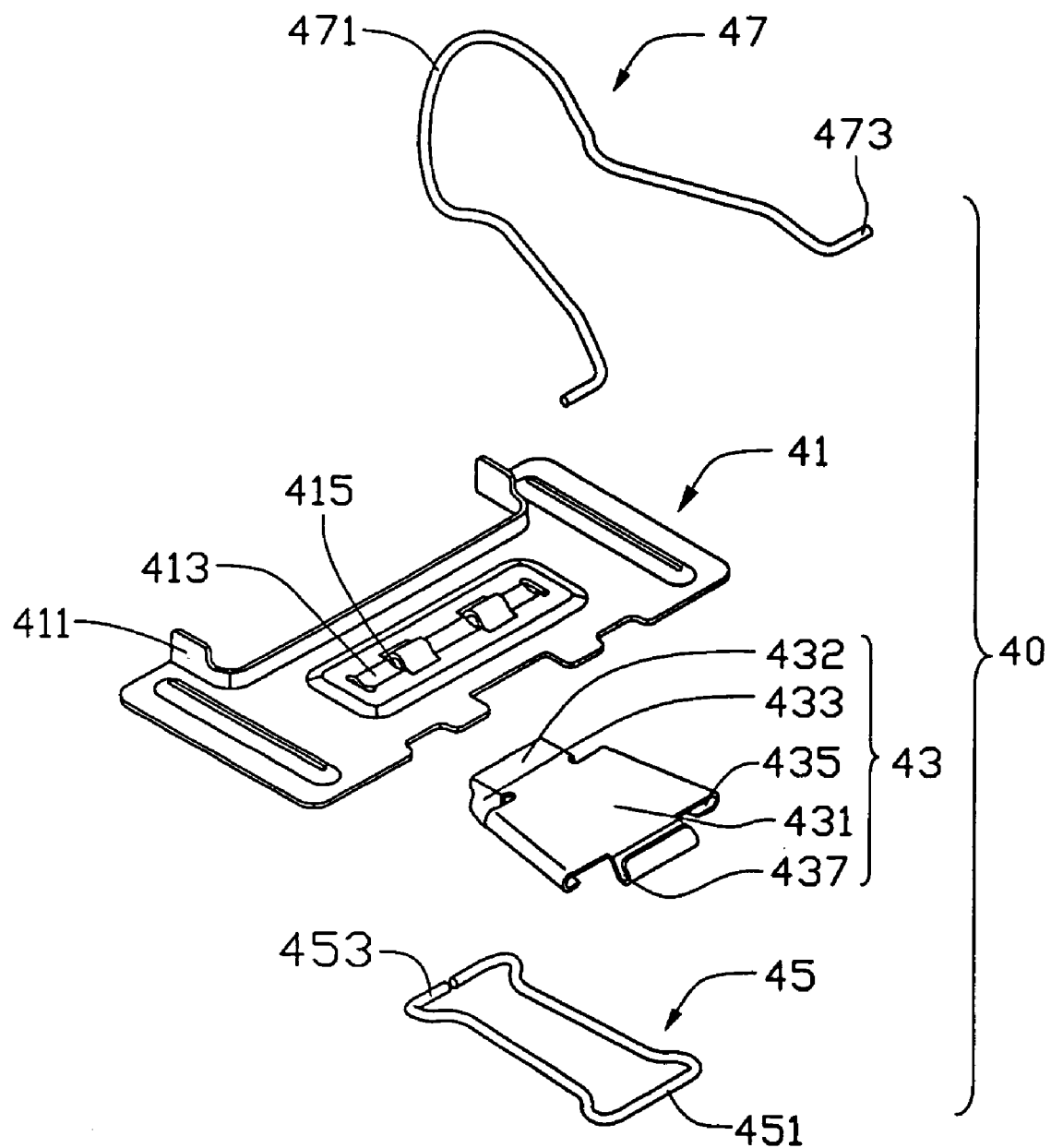
FIG. 2 is an enlarged view of the driving device of FIG. 1.

Referring also to FIG. 2, The driving device 40 is a crank device which includes a sliding board 41, a connecting block 43, a linking element 45, and a pull handle 47. A rear end of the sliding board 41 upwardly forms two positioning plates 411. A middle portion of the sliding board 41 is stamped downwardly to define an assembly groove 413. Two curved bridges are stamped upwardly from two opposite sides of the assembly groove 413 thereby defining two through slots 415. The connecting block 43 generally has a wedge shaped. The connecting block 43 includes a main body 431, a narrow head portion 432 extending from a rear end of the main body 431, and a pivot portion 437 bent from a front end of the main body 431. Two locking plates 433 are bent downwardly from the head portion 432. Two opposite sides of the main body 431 are bent downwardly and then inwardly to form two receiving portions 435, respectively. The linking element 45 and the pull handle 47 each are made from bending a metal wire. The linking element 45 is generally like a bone shape, the pull handle 47 is generally like an "Ω" shape. The linking element 45 has a connecting end 451 and two free ends 453, the pull handle 47 has a grasp end 471 and two free ends 473.

Figure 4:
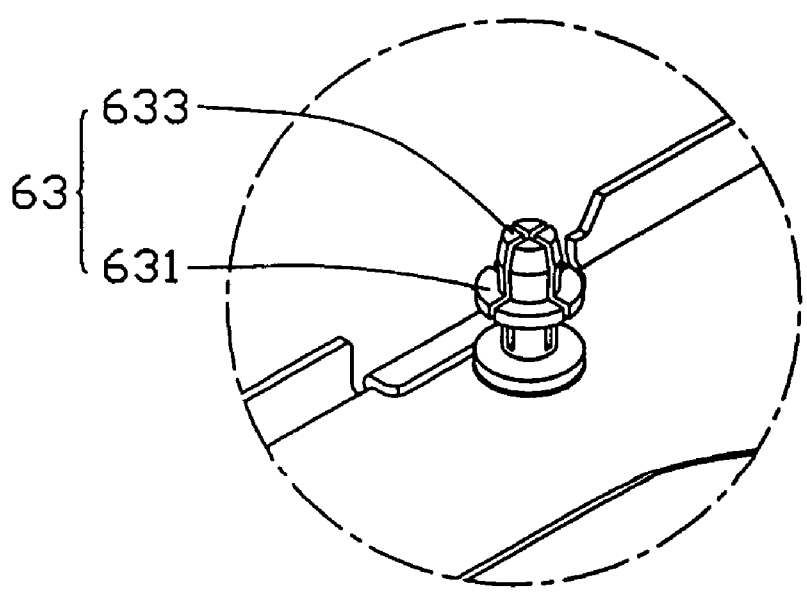
FIG. 4 is an enlarged view of the encircled portion IV of FIG. 1.

The tray 60 includes a base plate 61 and a handle plate 62 extending upwardly from a front edge of the base plate 61. The base plate 61 upwardly forms a plurality of standoffs 63 corresponding to the through holes 12 of the PCB 10. Referring also to FIG. 4, each standoff 63 has a circular support portion 631 and a clasp portion 633. The base plate 61 defines a plurality of fastening holes 65 corresponding to the fastening portions 21 of the fixing board 20. Each fastening hole 65 includes a wide section 651 and a narrow section 653. A width of the narrow section 653 is not less than that of the tongue 213 of the fastening portion 21 of the fixing board 20. Two guiding grooves 67 are defined in the tray 60 corresponding to the guiding posts 23 of the fixing board 20. A plurality of blocking plates 69 is downwardly formed from opposite side edges of the tray 60 corresponding to the curb tabs 22 of the fixing board 20. When moving the tray 60, the blocking plates 69 can slide along the curb tabs 22. Two positioning holes 68 (shown in FIG. 7) are defined in the tray 60 corresponding to the positioning plates 411 of the driving device 40.

Figure 5:
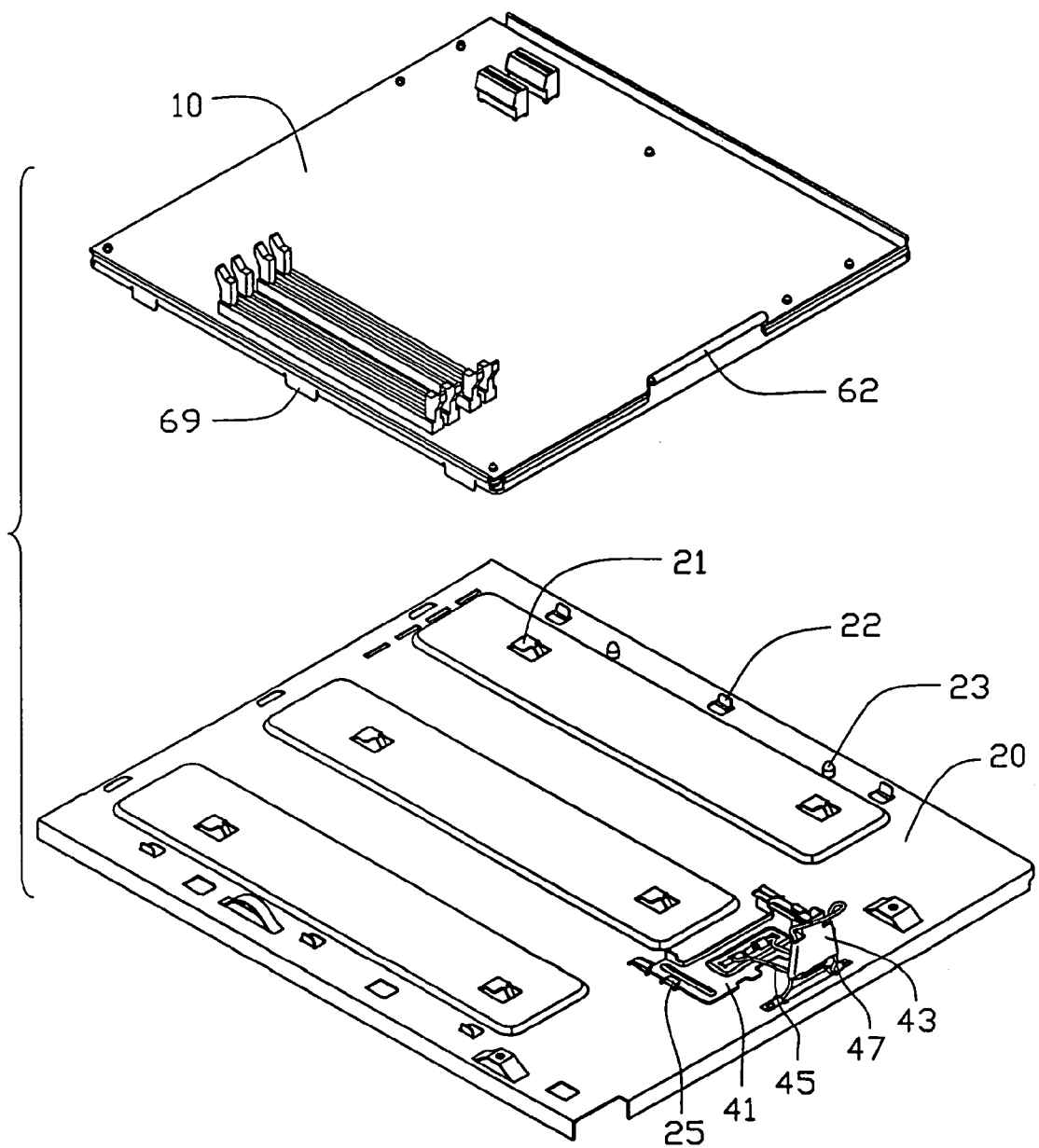
FIG. 5 is an isometric view of FIG. 1, showing the driving device assembled to the fixing board, the PCB assembled to the tray.

Referring also to FIG. 5, two opposite side edges of the sliding board 41 are inserted in the sliding space of the bent pieces 25, and slidable along the bent pieces 25 in a front-to-back direction. The connecting end 451 of the linking element 45 is pivotally disposed in the pivot portion 437 of the connecting block 43; the free ends 453 of the linking element 45 are respectively pivotally engaged in the through slots 415 of the sliding board 41. The pull handle 47 is received in the receiving portions 435 of the connecting block 43; the grasp end 471 extends out of the head portion 432; the free ends 473 are pivotally engaged in the through slots 29 of the fixing board 20.

Figure 6:
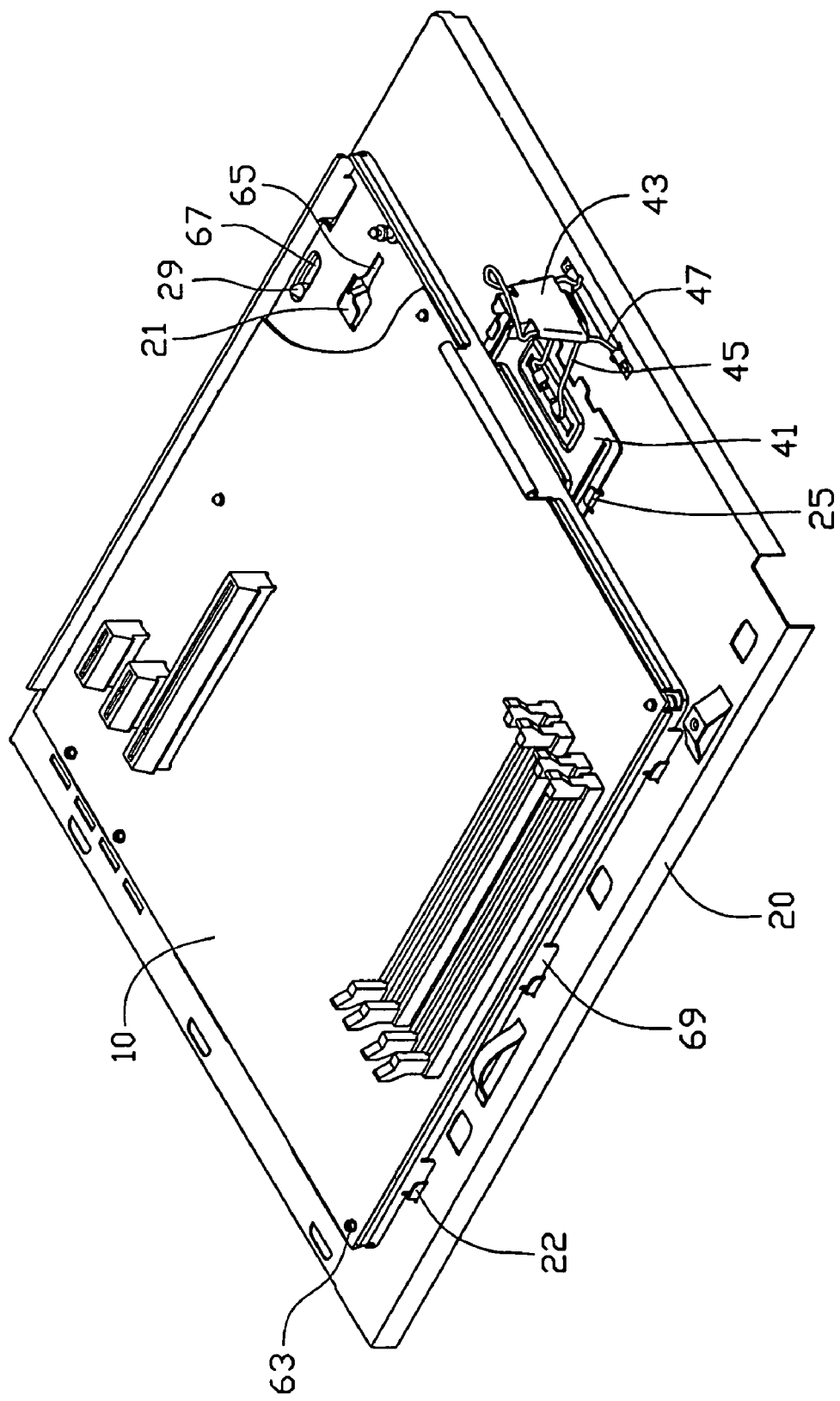
FIG. 6 is an assembled view of FIG. 1, showing the tray and the PCB in an unlocked position.
Figure 7:
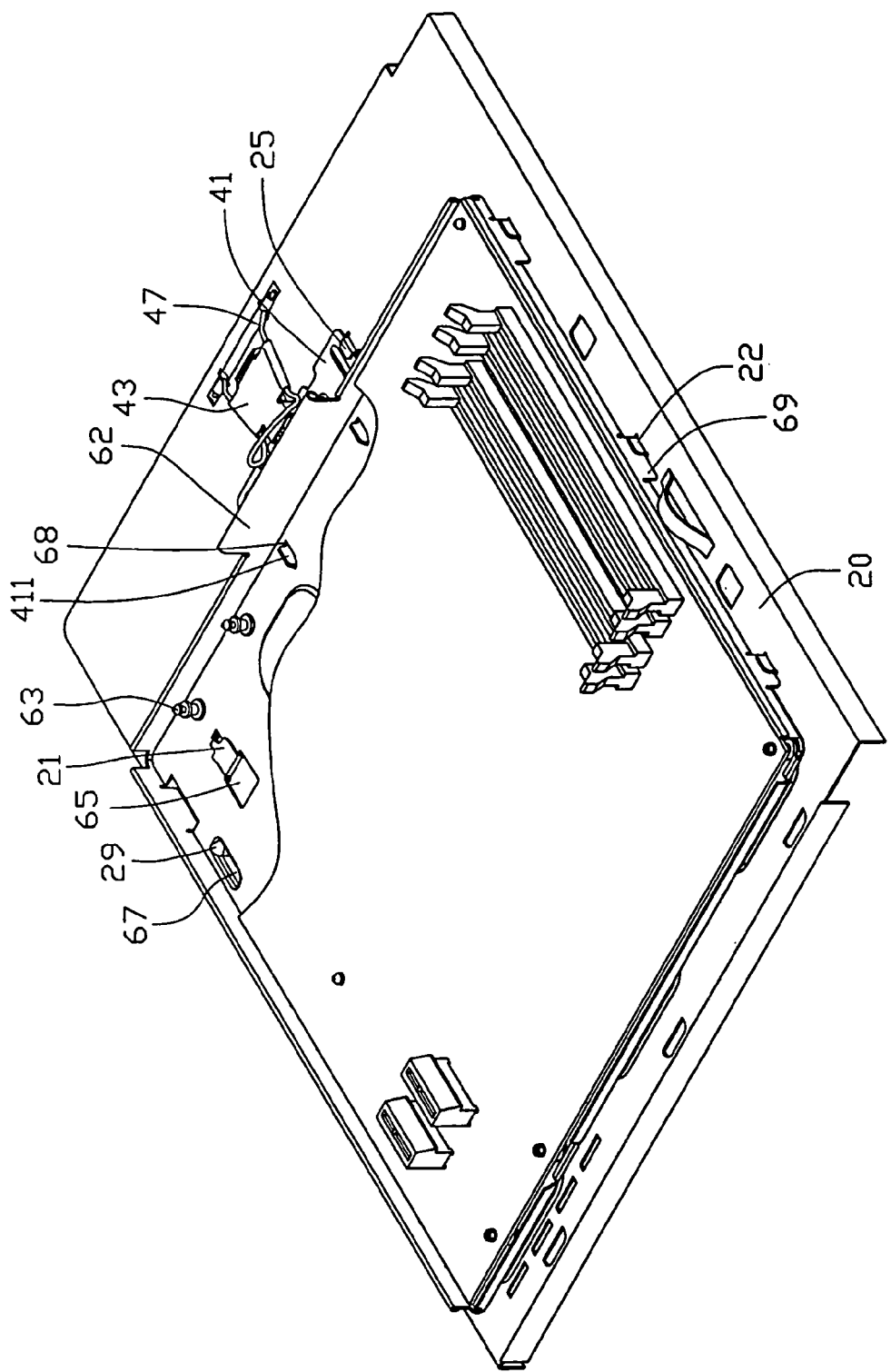
FIG. 7 is similar to FIG. 6, showing the tray and the PCB in a locked position.

Referring also to FIGS. 6 and 7, in assembly, the clasp portions 633 of the standoffs 63 of the tray 60 are snappingly engaged in the through holes 12 of the PCB 10. The PCB 10 is supported on the clasp portions 631 of the standoffs 63, and retained a certain distance from the tray 60. The tray 60 is then disposed on the fixing board 20. The positioning plates 411 of the sliding board 41 are engaged in the positioning holes 68 of the tray 60. The guiding posts 23 of the fixing board 20 enter the guiding grooves 67. The fastening portions 21 of the fixing board 20 enter the fastening holes 65 of the tray 60. The pull handle 47 of the driving device 40 is pulled downwardly, the connecting block 43 going with the pull handle 47 drives the linking element 45 rearward, so that the linking element 45 drives the sliding board 41 rearward. The tray 60 is moved until a root of the fastening tab 211 of each fastening portion 21 abuts against a junction of the wide section 651 and the narrow section 653 of a corresponding fastening hole 65. The fastening tab 211 of each fastening portion 21 presses on the tray 60. The PCB 10 is thus securely assembled to the fixing board 20.

In removing the tray 60 and the PCB 10, the pull handle 47 is pulled upwardly, the connecting block 43 together with the pull handle 47 rotates forwardly. The linking element 45 is pulled forwardly by the connecting block 43, so that the sliding board 41 together with the tray 60 and the PCB is pulled forwardly. The fastening portions 21 thus enter the wide sections 651 of the fastening holes 65. The tray 60 and the PCB 10 are capable of being taken off from the fixing board 20 of the computer chassis.

The PCB 10 is lifted to disengage the standoffs 63 of the tray 60 from through holes 12 of the PCB 10.

In another preferred embodiment, the sliding board 41 can be directly formed from the tray 60.

It is believed that the present embodiment and its advantages will be understood from the foregoing description, and it will be apparent that various changes may be made thereto without departing from the spirit and scope of the invention or sacrificing all of its material advantages, the example hereinbefore described merely being a preferred or exemplary embodiment.

I claim:

1. A fixing mechanism adapted for securing a printed circuit board to an electronic device, the fixing mechanism comprising:
   a fixing board forming a plurality of fastening portions;
   a tray adapted for securing the printed circuit board, the tray defining a plurality of fastening holes corresponding to the fastening portions of the fixing board; and
   a driving device comprising a sliding board slidably attached to the fixing board, a pull handle pivotally connected to the fixing board around an axis parallel with the fixing board, a connecting block arranged to the pull handle, and a linking element, wherein the linking element has one end pivotably attached to the connecting block, and an opposite end pivotably attached to the sliding board, the tray is connected to the sliding board, such that when the pull handle is pivoted, the linking element is capable of sliding the sliding board along the fixing board.

2. The fixing mechanism as claimed in claim 1, wherein each of the fastening portions comprises a wide L-shaped fastening tab stamped upwardly from the fixing board, and a tongue slantingly connecting the fastening tab to the fixing board; each of the fastening holes comprises a wide section and a narrow section.

3. The fixing mechanism as claimed in claim 1, wherein the sliding board comprises at least one positioning plate, the tray defines at least one linear positioning hole for linearly sliding of said positioning plate therein.

4. The fixing mechanism as claimed in claim 1, wherein the fixing board forms a pair of parallel bent pieces extending towards each other to hold opposite sides of the sliding board, thereby to retain the sliding board sliding in a linear direction.

5. The fixing mechanism as claimed in claim 1, wherein the connecting block defines a main body and a head portion extending from the main body, the fixing board defines at least one assembly hole to engaging with the head portion when the pull hand is laid down to the fixing board.

6. The fixing mechanism as claimed in claim 5, wherein the pull hand is made by bending a metal wire to be an "Ω" shape, the pull hand comprising a grasp end, two free ends, and two connecting arms connecting the grasp end to the free ends, the main body of the connecting block is wedge-shaped and bent inwardly from opposite sides thereof to hold the two connecting arms of the pull handle.

7. The fixing mechanism as claimed in claim 5, wherein a pivot portion is bent from a front end of the main body to form a pivot axis parallel to the fixing board, thereby to pivotally retain said one end of the linking element; the other end of the linking element is capable of pivoting around an axis formed parallely on the sliding board, the linking element is made by bending a metal wire.

8. The fixing mechanism as claimed in claim 1, wherein at least one guiding post extends upwardly from the fixing board, at least one guiding groove is defined in the tray along a moving direction of the tray to slidably receive said guiding post.

9. A fixing mechanism adapted for securing a printed circuit board to an electronic device, the fixing mechanism comprising:
   a fixing board;
   a tray adapted for securing the printed circuit board; and
   a crank device connected between the tray and the fixing board to move the tray regarding with the fixing board, the crank device comprising a pull handle having a pivot end pivotally connected to the fixing board around an axis parallel with the fixing board, and a linking element;
   wherein one end of the linking element is pivotally connected to the pull handle except the pivot end, the other end of the linking element is pivotally connected to the tray;
   wherein the pull handle is rotated to move the tray in a linear direction.

10. The fixing mechanism as claimed in claim 9, wherein the crank device comprises a connecting block secured to the pull handle, the connecting block comprising a locking plate extending downwardly therefrom to engage in a locking hole of the tray when the pull handle is rotated downwardly.

11. The fixing mechanism as claimed in claim 10, wherein the connecting block forms a pivot portion to pivotably connect said one end of the linking element.

12. The fixing mechanism as claimed in claim 9, wherein the crank device comprises a sliding board slidably attached to the fixing board, the tray being attached to the sliding board, said other end of the linking element is pivotally connected to the sliding board.

13. The fixing mechanism as claimed in claim 9, wherein the pull handle and the linking element each are formed by bending a metal wire.

14. An electronic device comprising:

a chassis enclosing said electronic device;

a printed circuit board assembly of said electronic device for performing functions of said electronic device, said printed circuit board assembly movable between a first position thereof where said printed circuit board assembly is secured to said chassis, and a second position thereof where said printed circuit board assembly is released and removable away from said chassis; and a driving device disposed next to said printed circuit board assembly, and comprising a handle and a sliding board removably engagable with said handle and said printed circuit board assembly respectively, said handle being movable between a farther position thereof away from said printed circuit board assembly where said printed circuit board assembly is urged via said sliding board to move from said first position thereof to said second position thereof, and a closer position thereof to said printed circuit board assembly where said printed circuit board assembly is urged via said sliding board to move from said second position thereof to said first position thereof;

wherein said handle is pivotally attachable to said chassis around an axis parallel to said printed circuit board assembly in said first position so as to be movable between said farther and closer positions thereof relative to said printed circuit board assembly.

15. The electronic device as claimed in claim 14, wherein said printed circuit board assembly comprises a printed circuit board for said performing and a tray removably attachable to said printed circuit board.

16. The electronic device as claimed in claim 14, wherein a linking element is attachably engagable with said handle and said sliding board so that said handle is capable of urging movement of said printed circuit board assembly via said sliding board.

17. The electronic device as claimed in claim 14, wherein a moving direction of said handle between said farther position thereof and said closer position thereof is substantially parallel to a moving direction of said tray between said first position thereof and said second position thereof.

* * * * *